(12) United States Patent
Samra et al.

(10) Patent No.: US 6,519,683 B2
(45) Date of Patent: Feb. 11, 2003

(54) SYSTEM AND METHOD FOR INSTRUCTION CACHE RE-ORDERING

(75) Inventors: Nicholas G. Samra, Austin, TX (US); Bradley G. Burgess, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 201 days.

(21) Appl. No.: 09/752,414

(22) Filed: Dec. 29, 2000

(65) Prior Publication Data

US 2002/0087793 A1 Jul. 4, 2002

(51) Int. Cl.[7] .............................................. G06F 12/00
(52) U.S. Cl. ...................................................... 711/125
(58) Field of Search ......................................... 711/125

(56) References Cited

U.S. PATENT DOCUMENTS 5,375,220 A * 12/1994 Ishikawa

* cited by examiner

Primary Examiner—Jack A. Lane
(74) Attorney, Agent, or Firm—Kenyon & Kenyon

(57) ABSTRACT

The present invention is directed to a system and method for implementing a re-ordered instruction cache. In one embodiment, groups or "packets" of instructions with specific packet sizes are formed. Each of packets includes two or more positions. The two or more positions are defined such that they support one or more different types of instructions. Each of the positions are also correlated to a subset of the specialized execution units of the processor. Given a specific packet size and definitions for each of the positions, each of the instructions are re-ordered according to instruction type and loaded into the instruction cache in the new order.

25 Claims, 5 Drawing Sheets

SYSTEM AND METHOD FOR INSTRUCTION CACHE RE-ORDERING

BACKGROUND OF THE INVENTION

I. Field of the Invention

This invention relates generally to computer technology, and more particularly, to improving processor performance in a computer system.

II. Background Information

In high-performance processors, one of the keys to improving performance is reducing execution latency, i.e., the number of clock cycles an instruction takes to execute. One way to reduce execution latency is to use execution units such as specialized execution units. Each specialized execution unit only executes a sub-set of the architectural instructions; several different specialized execution units are implemented in conjunction with each other on the microprocessor to cover execution of the entire instruction set. Since each specialized execution unit only performs a small number of functions, that execution unit can operate faster than a fully comprehensive execution unit.

The disadvantage of utilizing specialized execution units is the necessity to steer various instructions to their appropriate execution units. This steering function becomes exponentially more difficult with an increase in the degree of superscalar dispatch (i.e., dispatching multiple instructions simultaneously per clock cycle to the execution units) for the processor. Steering instructions to specialized execution units is handled by a full crossbar. This full crossbar provides a path for each instruction to travel to each execution unit. The number of paths in a full crossbar is proportional to the number of execution units multiplied by the number of instructions being steered per cycle. Depending on the degree of superscalar dispatch the processor employs, the crossbar can become quite cumbersome in terms of the number of routing wires needed and/or silicon area. In addition, for a processor running at high frequencies, it may take several cycles for the instructions to be routed through this extensive crossbar; this increase in pipeline depth lowers processor performance (i.e., if latches are used because instructions cannot reach its destination in one clock cycle, then the latches contribute to an increase in pipeline depth which results in a decrease in processor performance).

FIG. 1 shows an example of dispatching instructions to execution units in a prior art processor implementation. In this example, a cache line 158 (cache line 158 may have a dispatch buffer that extends from the cache line) of an instruction cache includes four positions, each of the four positions stores an instruction. A crossbar 152 steers instructions and provides a path between each of the four positions of cache line 158 and each of the specialized execution units 143a–e. Each of the positions of cache line 158 has a path to all specialized execution units 143a–e because any type of instruction may be stored in any of the positions of cache line 158 and thus all positions should have access to all specialized execution units 143a–e in order to dispatch any type of instruction to any of execution units 143a–e.

Each of specialized execution units 143a–e includes a corresponding one of schedule queues 155a–e. Each of the schedule queues 155a–e, among other functions, stores instructions in one or more entries until the instructions can be executed by a particular processing unit within the execution unit (e.g., the processing unit may be an arithmetic logic unit ("ALU"), a memory unit ("MEM"), or a complex operation unit ("CMPLX")). A write port writes the instructions to the one or more entries (the write ports correspond to the arrows entering a particular one of specialized execution units 143a–e). The number of write ports within the schedule queue depends on the number of instructions that may be dispatched to the execution unit in one clock cycle. In FIG. 1, assuming that the processor employs a degree-4 superscalar dispatch (i.e., four instructions are dispatched simultaneously in one clock cycle), each of the schedule queues 155a–e has four write ports. Here, four write ports are used because in any one clock cycle, up to four instructions may be dispatched to a particular one of specialized execution units 143a–e.

If the instructions are re-ordered prior to loading them into the instruction cache, the size of the crossbar and the number of write ports within an execution unit may be significantly reduced resulting in improved processor performance. For the foregoing reasons, there is a need for re-ordering instructions prior to loading them into an instruction cache.

DETAILED DESCRIPTION

Re-ordering instructions prior to loading the instructions into an instruction cache eliminates the disadvantages of an extensive crossbar and the use of a large number of write ports, while still retaining the performance benefits of wide superscalar dispatch coupled with execution units such as specialized execution units. This is accomplished by forming groups or "packets" of instructions with specific boundaries. Each of packets include two or more positions. The two or more positions are defined such that they support one or more different types of instructions. Each of the positions are also correlated to a subset of the specialized execution units of the processor. Given the packet size and definitions for each of the positions, each of the instructions are re-ordered according to instruction type and loaded into the instruction cache in the new order. By performing this re-ordering prior to loading the instructions into the instruction cache, the crossbar is reduced to a small number of straight-forward dispatch paths, and the number of write ports used is reduced since a fewer number of instructions may be dispatched to a particular one of the execution units in any one clock cycle.

Figure 2:
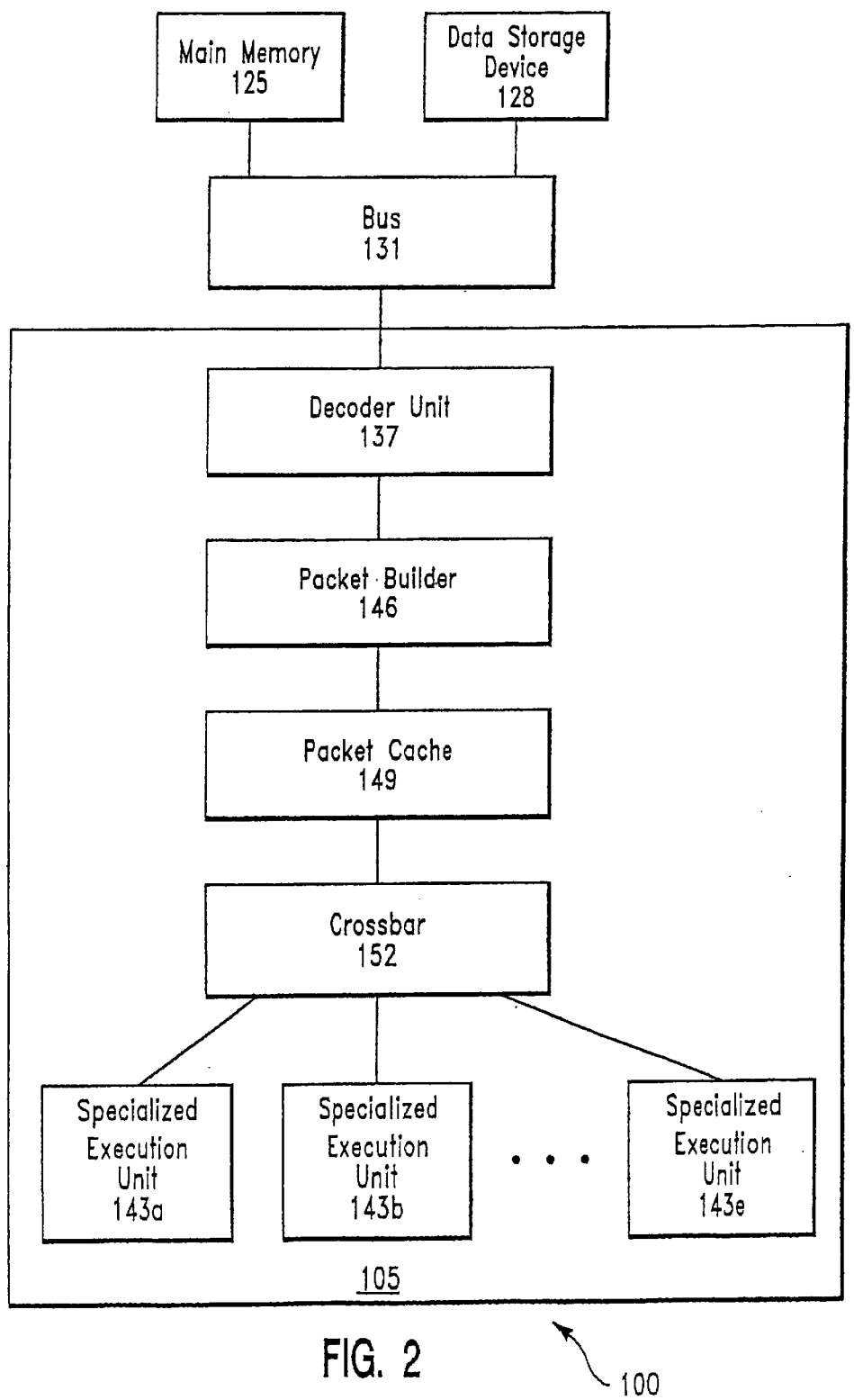
FIG. 2 shows a block diagram of a computer system according to an embodiment of the present invention.

FIG. 2 shows a block diagram of a computer system 100 according to an embodiment of the present invention. In this embodiment, computer system 100 includes a bus 131 for communicating information between the components of computer system 100, and a processor 105 for executing instructions and processing information. Computer system 100 further includes a main memory 125, coupled to bus 131, for dynamically storing information and instructions to be executed by processor 105. Computer system 100 includes a data storage device 128, coupled to bus 131, for statically storing data. Data storage device 128 may be a magnetic disk or optical disk and its corresponding disk drive.

FIG. 2 also includes the pipeline units of processor 105. Instructions are initially fetched from one of the memory devices (e.g., main memory 125) into a decoder unit 137, coupled to bus 131, that decodes each instruction into a set of micro-operations (uops).

The instructions are then sent to a packet builder 146, coupled to decoder unit 137, to re-order the instructions according to the type of the instructions and the definition of each of the positions within a packet. Packet builder 146 maps positions within the cache lines of a packet cache 149 and divides them into packets based on a packet size. The size of the packet (i.e., the number of positions within the packet), the definition of each of the positions (i.e., restrictions are placed on the type of instructions supported by each of the positions within the packet), and the correlation of each of the positions to a subset of specialized execution units 143a–e are set by the processor architecture. The size of the packet (i.e., the number of positions within a packet) depends on a number of factors. The packet size may equal the degree of superscalar dispatch.

Packet builder 146 also records the original order of the instructions in order to recover from instruction faults (e.g., if an instruction fault occurs, then instructions after the faulted instruction are discarded; here, the original order is used to determine the instructions that should be discarded). In addition, the original order is used to remove false dependencies among registers by register renaming, and this renaming is performed on an instruction within a position in the packet.

Packet builder 146 re-orders each of the instructions according to the type of that instruction and the type of instruction that a position within a packet supports. If the type of a particular instruction is supported by an available position in the packet, then that instruction is inserted into that position. Packet builder 146 may close a packet for several reasons. One reason for closing a packet is that none of the available positions within the packet supports the type of a particular instruction, therefore, that packet is closed and the particular instruction is inserted into the next packet.

Packet builder 146 loads each of the re-ordered instructions into an instruction cache, such as a packet cache 149. Packet cache 149, coupled to packet builder 146, is a high-speed cache memory for storing re-ordered instructions. A crossbar 152, coupled to packet cache 149, provides paths between each of the positions of a cache line within packet cache 149 to a subset of specialized execution units 143a–e. Crossbar 152 may also steer an instruction to an appropriate one of the specialized execution units 143a–e that can execute the instruction. Because the instructions are re-ordered as described above (i.e., each of the positions within a packet correlates to a subset of the specialized execution units of processor 105), the size of crossbar 152 is reduced to a small number of straight-forward dispatch paths.

Crossbar 152 provides a path to all of specialized execution units 143a–e. Each of the positions of a packet is correlated to a subset of execution units 143a–e. Each of the specialized execution units 143a–e includes a processing unit (e.g., the processing unit may be an ALU, a MEM unit, or a CMPLX unit) and a corresponding one of the schedule queues 155a–e. Each of specialized execution units 143a–e includes one or more write ports. Because the instructions are re-ordered as described above (i.e., each of the positions within a packet correlate to a subset of the specialized execution units of processor 105), fewer number of write ports are used since a fewer number of instructions may be dispatched to a particular one of the specialized execution units 143a–e in any one cycle.

Figure 3:
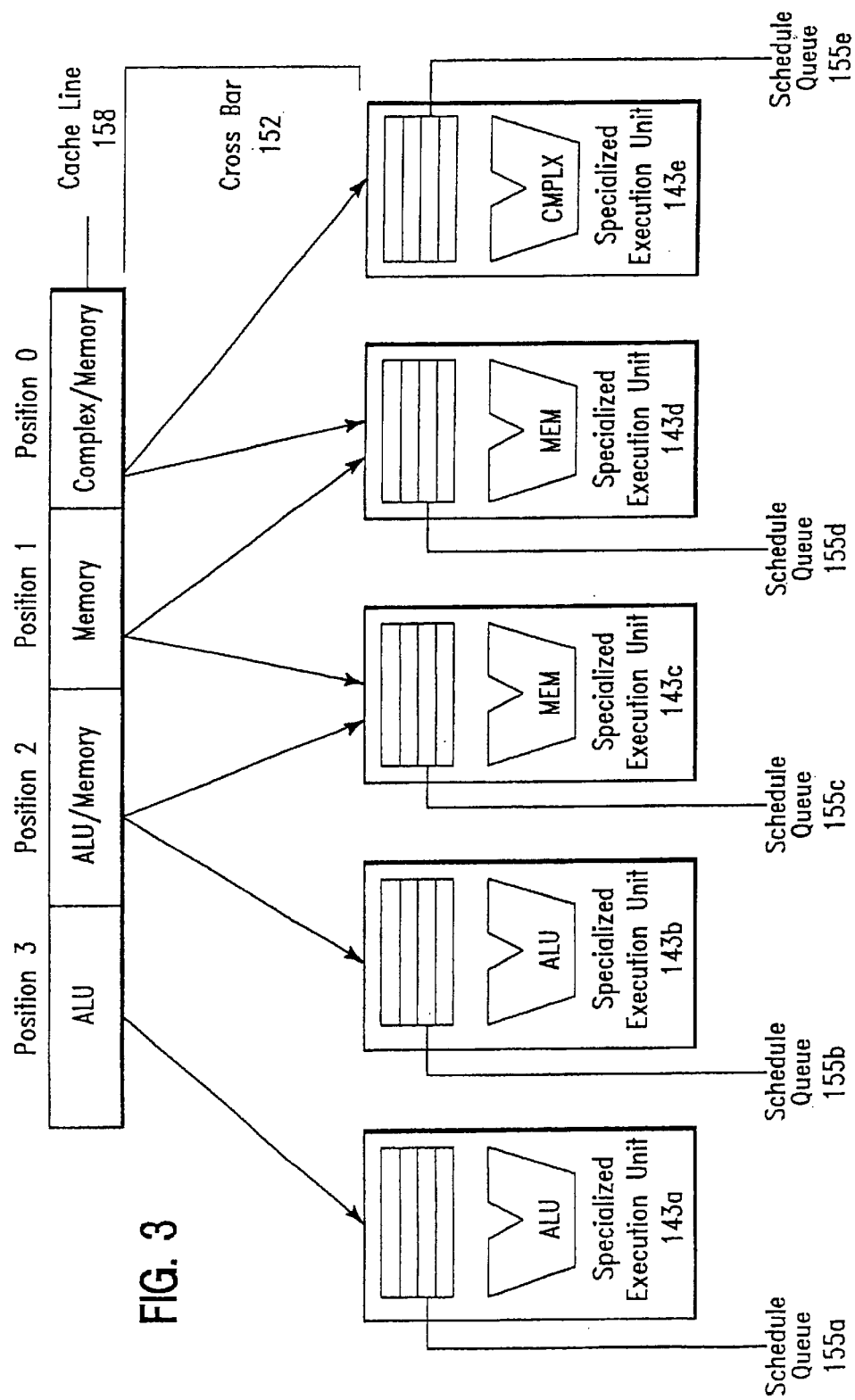
FIG. 3 shows an example of dispatching instructions to execution units according to an embodiment of the present invention.

FIG. 3 shows an example of dispatching instructions to execution units, such as specialized execution units 143a–e, according to an embodiment of the present invention. In this example, the packet size is chosen to be four, i.e., the packet includes four positions (position 0 to position 3) of cache line 158 within packet cache 149. Each of the four positions is defined to store one or more types of instructions. Each of the four positions also correlates to a subset of specialized execution units 143a–e of processor 105. In this example, position 3 is defined to store only ALU instructions (e.g., ADD and SUB instructions); position 2 is defined to store either ALU instructions or memory instructions (e.g., LD or ST instructions); position 1 is defined to store only memory instructions; and position 0 is defined to store only complex instructions (e.g., the MUL instruction) or memory instructions.

Crossbar 152 provides a path between each of the four positions of a packet and the subset of specialized execution units 143a–e that correlate to that position. In this example, crossbar 152 provides a path between position 3 (position 3 stores only ALU instructions) and specialized execution unit 143a that has an ALU processing unit for executing ALU instructions. Crossbar 152 also provides a path between position 2 (position 2 stores either ALU or memory instructions) and specialized execution unit 143b (which has an ALU processing unit for executing ALU instructions) and specialized execution unit 143c (which has a MEM processing unit for executing memory instructions). Crossbar 152 provides a path between position 1 (position 1 stores only memory instructions) and specialized execution unit 143c and specialized execution unit 143d (which has a MEM processing unit for executing memory instructions). Crossbar 152 also provides a path between position 0 (position 0 stores either complex or memory instructions) and specialized execution unit 143d and specialized execution unit 143e (which has a CMPLX processing unit for executing complex instructions). Crossbar 152 also performs some instruction steering, e.g., the instructions in position 1 of cache line 158 may be steered to either specialized execution unit 143c or specialized execution unit 143d. Because each of the positions within a packet correlate to a subset of the specialized execution units of processor 105, the size of crossbar 152 is reduced to a small number of straight-forward dispatch paths.

Figure 1:
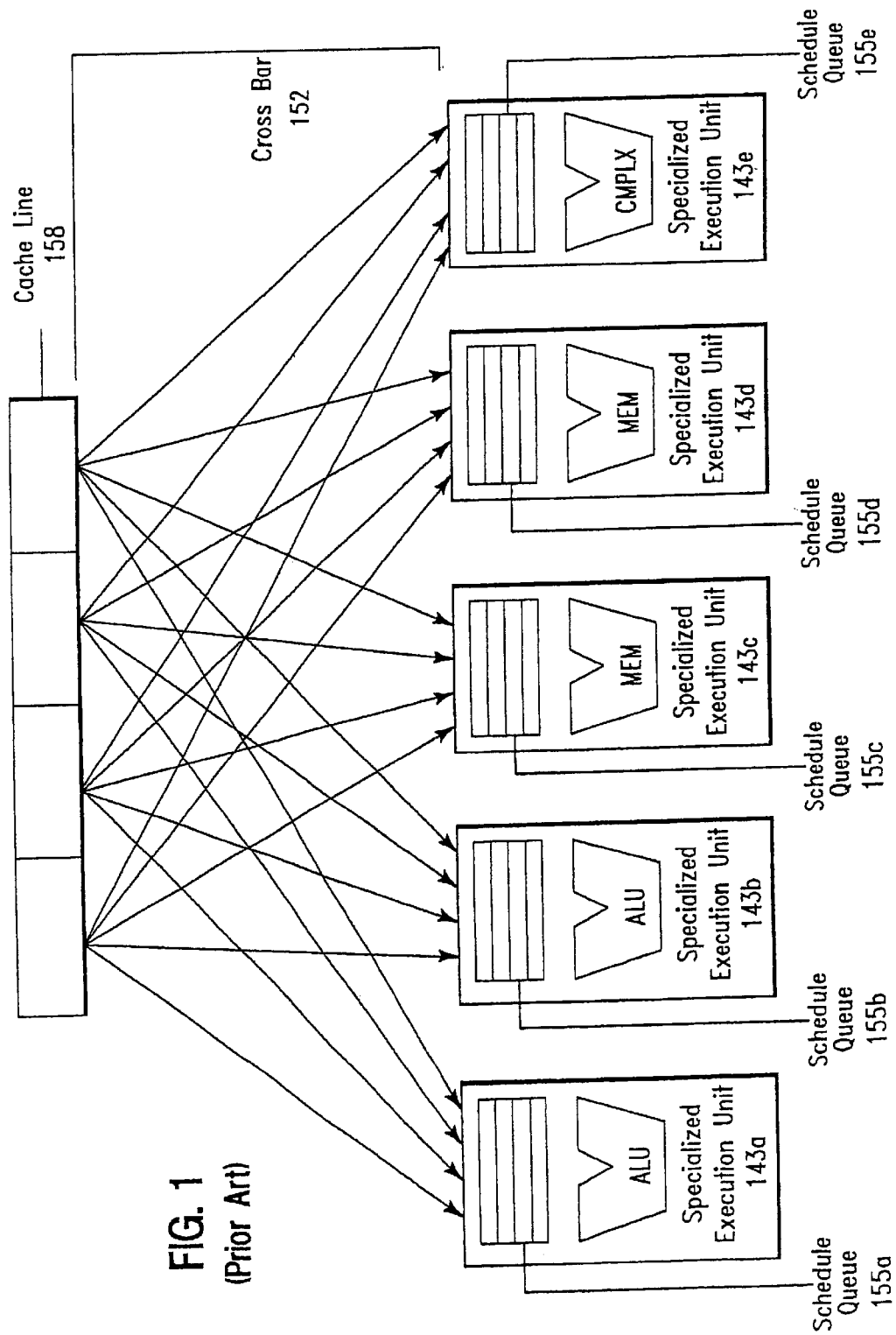
FIG. 1 shows an example of dispatching instructions to execution units in a prior art processor implementation.

Each of specialized execution unit 143a–e includes a corresponding one of schedule queues 155a–e. Each of the schedule queues 155a–e, among other functions, stores instructions in one or more entries until the instructions can be executed by a particular processing unit within the execution unit. The write port writes the instructions to the one or more entries. The number of write ports in a particular one of specialized execution units 143a–e depends on the number of instructions that may be dispatched to the execution unit in one clock cycle. Because each of the positions within a packet correlate to a subset of the specialized execution units of processor 105, fewer number of write ports are used since a fewer number of instructions may be dispatched to a particular one of the specialized execution units 143a–e in any one cycle. For example, in FIG. 3, schedule queue 155 a has only one write port because only one path from position three exists and thus specialized execution unit 143a will receive only one instruction per clock cycle (compare to FIG. 1 where schedule queue 155a has four write ports since up to four instructions may be dispatched to specialized execution unit 143a in one clock cycle).

Figure 4:
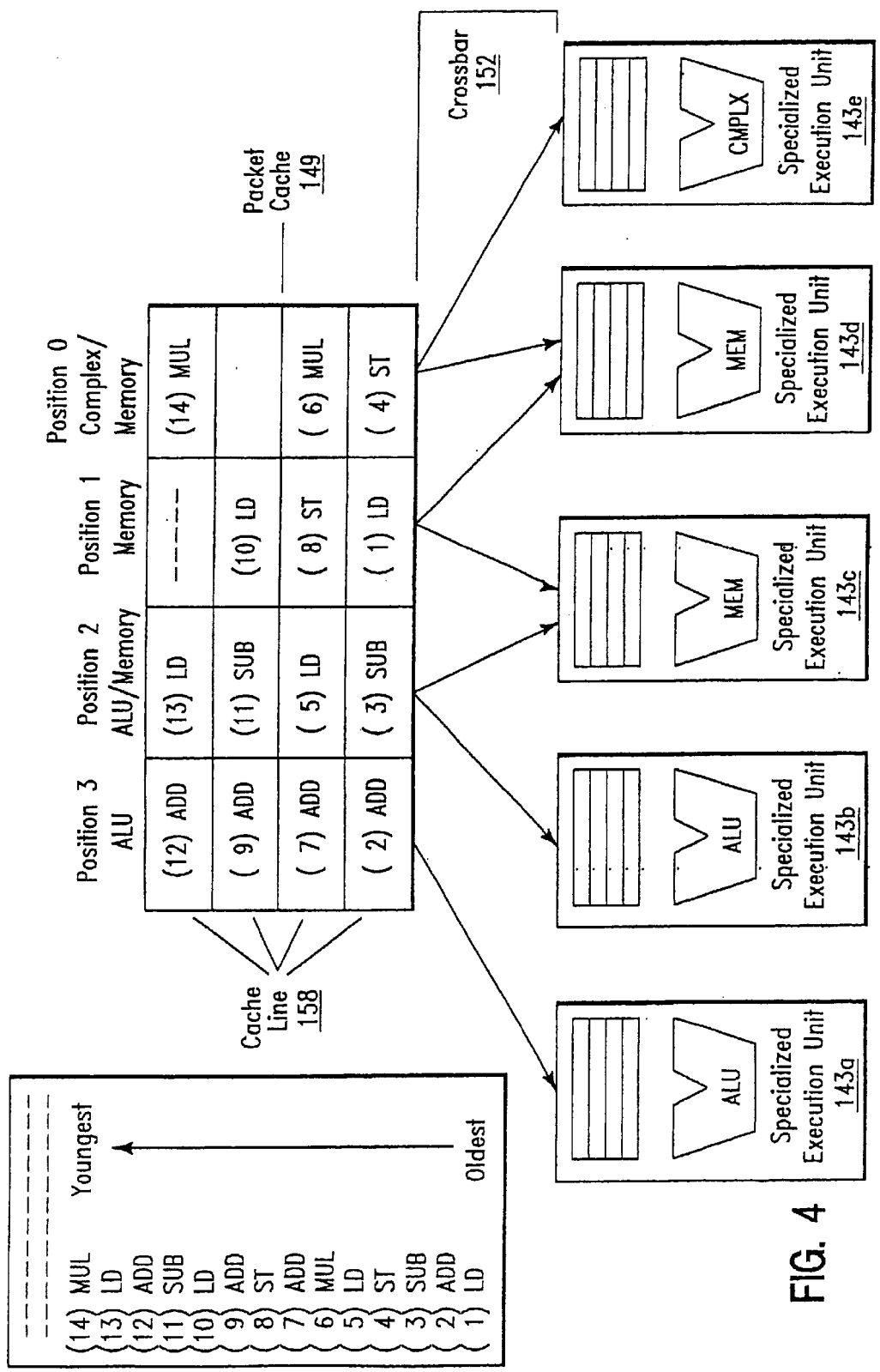
FIG. 4 shows an example of loading and dispatching instructions from an instruction cache according to an embodiment of the present invention.

FIG. 4 shows an example of loading and dispatching instructions from an instruction cache, such as packet cache 149, according to an embodiment of the present invention. Here, packet cache 149 includes the four cache lines 158. In this example, the packet size is set to four, and each of the four positions are defined and correlated to specialized execution units 143a–e of processor 105 as shown in FIG. 4 and as described earlier for FIG. 3. In FIG. 4, position 3 is defined to store only ALU instructions; position 2 is defined to store either ALU instructions or memory instructions; position 1 is defined to store only memory instructions; and position 0 is defined to store only complex instructions or memory instructions.

FIG. 4 also shows an example instruction stream. In this instruction stream, a load instruction ("LD") is the oldest instruction (e.g., the oldest instruction may be the first instruction to be fetched from, for example, main memory 125), followed by an add instruction ("ADD"), a subtract instruction ("SUB"), etc. Starting with the oldest instruction in the instruction stream, the LD instruction, packet builder 146 finds a position within the first packet that supports the LD instruction. In this example, the first packet is the bottom cache line 158 of packet cache 149. Here, position 1 of the first packet supports memory instructions and so the LD instruction is loaded into position 1 of the first packet. The next instruction, the ADD instruction, is loaded into position 3 of the first packet since that position supports ALU instructions. The next instruction, the SUB instruction, is loaded into position 2 of the first packet since that position supports ALU instructions. The next instruction, the ST instruction, is stored in position 0 of the first packet since that position supports memory instructions. Given the packet size of four, because all four positions within the first packet have been filled, the first packet is closed and a second packet is chosen for loading with instructions.

In this example, the second packet is cache line 158 that is second from the bottom. Continuing through the instruction stream, the LD instruction (i.e., "(5) LD" of the instruction stream) is loaded into position 2 of the second packet since that position supports memory instructions. The next instruction, the MUL instruction, is loaded into position 0 of the second packet since that position supports complex instructions. The next instruction, the ADD instruction, is loaded into position 3 of the second packet since that position supports ALU instructions. The next instruction, the ST instruction, is loaded into position 1 of the second packet since that position supports memory instructions. Given the packet size of four, because all four positions within the second packet have been filled, the second packet is closed and a third packet is chosen for loading with instructions.

In this example, the third packet is cache line 158 that is third from the bottom. Continuing through the instruction stream, the ADD instruction (i.e., "(9) ADD" of the instruction stream) is loaded into position 3 of the third packet since that position supports ALU instructions. The next instruction, the LD instruction, is loaded into position 1 of the third packet since that position supports memory instructions. The next instruction, the SUB instruction, is loaded into position 2 of the third packet since that position supports ALU instructions. The next instruction, the ADD instruction, cannot be loaded into the third packet since only position 0 of that packet is available and this position does not support ALU instructions. Therefore, the third packet is closed and a fourth packet is chosen for loading with instructions. Closing the third packet without loading an instruction into all the positions produces a "hole" (i.e., an empty position in the packet), but these holes can be minimized/eliminated by carefully selecting the restrictions on the types of instructions supported by the positions within the packet.

In this example, the fourth packet is the top-most cache line 158. The ADD instruction is loaded into position 3 of the fourth packet since that position supports ALU instructions. The next instruction, the LD instruction, is loaded into position 2 of the fourth packet since that position supports memory instructions. The next instruction, the MUL instruction, is loaded into position 0 of the fourth packet since that position supports complex instructions. The remainder of the instruction stream is loaded into packets within packet cache 149 in a similar manner.

Figure 5:
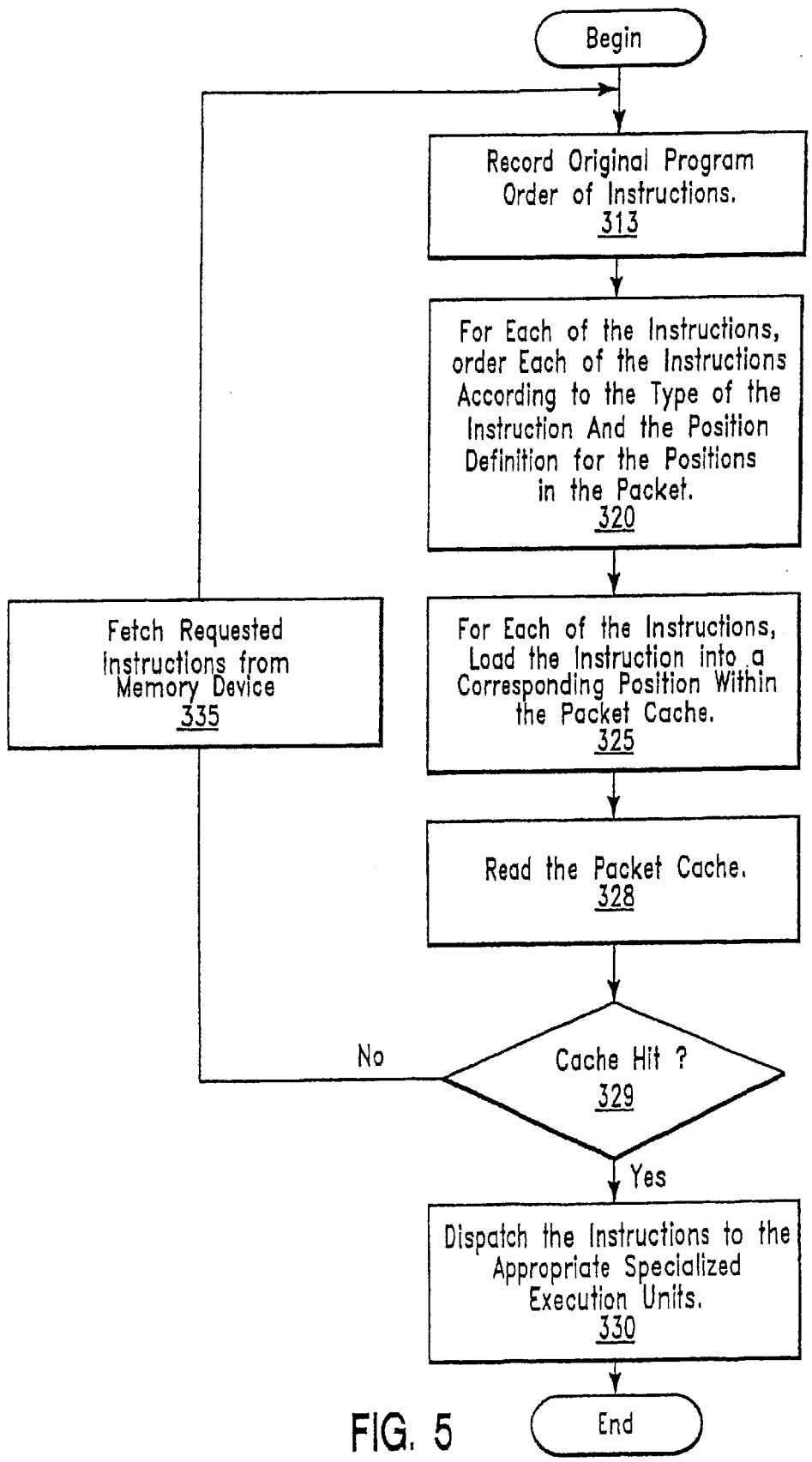
FIG. 5 shows a flowchart describing a process of loading an instruction cache according to an embodiment of the present invention.

FIG. 5 shows a flowchart describing a process of loading an instruction cache, such as packet cache 149, according to an embodiment of the present invention. In block 313, the original program order of the instructions of the instruction stream are recorded. The original order is recorded in order to, among other actions, recover from instruction faults (e.g., if an instruction fault occurs, then instructions after the faulted instruction are discarded; here, the original order is used to determine the instructions that should be discarded). In addition, the original order is used to remove false dependencies among registers by register renaming, and this renaming is performed on an instruction within a position in the packet.

In block 320, each of the instructions are re-ordered according to the type of the instruction and the position definitions for the positions in the packet. If the type of a particular instruction is supported by an available position in the packet, then that instruction is inserted into that position. A packet may be closed for several reasons. One reason for closing a packet is that none of the available positions within the packet supports the type of a particular instruction, therefore, that packet is closed and the particular instruction is inserted into the next packet.

In block 325, each of the instructions are loaded into a corresponding position within packet cache 149. In block 328, a read to packet cache 149 occurs (e.g., instructions are requested from packet cache 149). In block 329, whether a cache hit occurs is determined (e.g., whether the requested instructions are in packet cache 149). If the requested instructions are not in packet cache 149 (i.e., a cache miss occurs), then in block 335, the requested instructions are fetched from a memory device (e.g., main memory 125). If the requested instructions are in packet cache 149, then in block 330, those instructions are dispatched to the appropriate specialized execution units.

Although embodiments are specifically illustrated and described herein, it will be appreciated that modifications and variations of the present invention are covered by the above teachings and within the purview of the appended claims without departing from the spirit and intended scope of the invention.

What is claimed is:

1. A method, comprising:
   defining a packet size and each of a plurality of positions within a packet; and
   re-ordering each of a plurality of instructions to match a definition of a particular one of the plurality of positions within the packet, wherein the plurality of positions corresponds to a plurality of cache positions of a cache line within an instruction cache.

2. The method of claim 1, wherein the definition of each of the plurality of positions defines types of the plurality of instructions that the position supports.

3. The method of claim 2, further comprising correlating each of the plurality of positions with a subset of a plurality of execution units of a processor.

4. The method of claim 3, further comprising steering a particular one of the plurality of instructions that matches the types of the plurality of instructions supported by a particular one of the plurality of positions to a particular one of the subset of the plurality of execution units that correlate to the particular one of the plurality of positions and can execute the particular one of the plurality of instructions.

5. The method of claim 3, wherein correlating each of the plurality of positions with the subset of the plurality of execution units allows a crossbar to have only dispatch paths from a particular one of the plurality of cache positions within the cache line to the subset of the plurality of execution units that correlate to the particular one of the plurality of cache positions.

6. The method of claim 2, wherein re-ordering each of the plurality of instructions includes closing the packet if the definition for none of the plurality of positions that are available supports a type of a particular one of the plurality of instructions.

7. The method of claim 1, further comprising recording an order of the plurality of instructions prior to re-ordering the plurality of instructions.

8. The method of claim 1, wherein the packet size equals a degree of superscalar dispatch.

9. The method of claim 1, wherein correlating each of the plurality of cache positions to the subset of the plurality of execution units allows a number of write ports within a particular one of the subset of the plurality of execution units to equal a number of dispatch paths to the particular one of the subset of the plurality of execution units from that position.

10. The method of claim 1, further comprising loading a particular one of the plurality of cache positions of the cache line with a corresponding one of the plurality of positions of the packet.

11. A processor, comprising:
    a packet builder to re-order each of a plurality of instructions to match a definition of a particular one of a plurality of positions within a packet,
    wherein the plurality of positions corresponds to a plurality of cache positions of a cache line within an instruction cache coupled to the packet builder.

12. The processor of claim 11, wherein the definition of each of the plurality of positions defines types of the plurality of instructions that the position supports.

13. The processor of claim 12, wherein each of the plurality of positions correlate to a subset of a plurality of execution units of a processor.

14. The processor of claim 13, further comprising a crossbar, coupled to the instruction cache, that steers a particular one of the plurality of instructions that matches the types of the plurality of instructions supported by a particular one of the plurality of positions to a particular one of the subset of the plurality of execution units that correlate to the particular one of the plurality of positions and can execute the particular one of the plurality of instructions.

15. The processor of claim 14, wherein the crossbar has only dispatch paths from a particular one of the plurality of cache positions within the cache line to the subset of the plurality of execution units that correlate to the particular one of the plurality of cache positions.

16. The processor of claim 12, wherein the packet builder re-ordering each of the plurality of instructions includes closing the packet if the definition for none of the plurality of positions that are available supports a type of a particular one of the plurality of instructions.

17. The processor of claim 11, wherein the packet builder records an order of the plurality of instructions prior to re-ordering the plurality of instructions.

18. The processor of claim 11, wherein the packet size equals a degree of superscaler dispatch.

19. The processor of claim 11, wherein a number of write ports within a particular one of the subset of the plurality of execution units equals a number of dispatch paths from the plurality of cache positions to the particular one of the subset of the plurality of execution units.

20. The processor of claim 11, wherein the packet builder loads a particular one of the plurality of cache positions of the cache line with a corresponding one of the plurality of positions of the packet.

21. A method, comprising:
    decoding a plurality of instructions;
    defining a packet size and each of a plurality of positions within a packet; and
    re-ordering each of the plurality of instructions to match the definition of a particular one of the plurality of positions within the packet,
    wherein the plurality of positions corresponds to a plurality of cache positions of a cache line within an instruction cache.

22. The method of claim 21, wherein the definition of each of the plurality of positions defines types of the plurality of instructions that the position supports.

23. The method of claim 22, further comprising correlating each of the plurality of positions with a subset of a plurality of execution units of a processor.

24. The method of claim 22, wherein re-ordering each of the plurality of instructions includes closing the packet if the definition for none of the plurality of positions that are available supports a type of a particular one of the plurality of instructions.

25. The method of claim 21, wherein the packet size equals a degree of superscalar dispatch.

* * * * *